United States Patent
Bottner et al.

(10) Patent No.: US 7,844,551 B1
(45) Date of Patent: Nov. 30, 2010

(54) SECURE, ANONYMOUS AUTHENTICATION FOR ELECTRONIC PURCHASING WITH DYNAMIC DETERMINATION OF PAYMENT PRICING AND TERMS AND CROSS VENDOR TRANSACTION RESOLUTION

(75) Inventors: Keith C. Bottner, Richardson, TX (US); David D. Halpin, Plano, TX (US)

(73) Assignee: Patent Investments of Texas, LLC, Dallas, TX (US)

( * ) Notice: Subject to any disclaimer, the term of this patent is extended or adjusted under 35 U.S.C. 154(b) by 1336 days.

(21) Appl. No.: 10/677,827

(22) Filed: Oct. 2, 2003

(51) Int. Cl.
*G06Q 20/00* (2006.01)
(52) U.S. Cl. .............................. 705/78; 705/77; 705/64
(58) Field of Classification Search ................... 705/78, 705/77, 64
See application file for complete search history.

(56) References Cited

U.S. PATENT DOCUMENTS

| | | | | |
|---|---|---|---|---|
| 6,931,382 B2 * | 8/2005 | Laage et al. | | 705/67 |
| 6,938,019 B1 * | 8/2005 | Uzo | | 705/65 |
| 7,110,987 B2 * | 9/2006 | Engelhart | | 705/75 |
| 7,136,841 B2 * | 11/2006 | Cook | | 705/75 |
| 7,146,342 B1 * | 12/2006 | Angelin et al. | | 705/76 |
| 2002/0111907 A1 * | 8/2002 | Ling | | 705/41 |

* cited by examiner

*Primary Examiner*—Ramsey Refai

(57) ABSTRACT

Micro-payments for electronic sales transactions are securely and anonymously enabled by a central payment agent maintaining declining balance accounts for users and separately authenticating and authorizing customer and vendor transaction requests and payment upon confirmation of delivery. No personal billing information for the customer need be provided to the vendor, maintaining anonymity of the vendor. The vendor may electively set a pricing and terms policy allowing the price of the goods or services to dynamically vary across a series of transactions or transaction portions based on events such as quantity, bandwidth, or aggregate amount paid. A transaction may involve goods or services from multiple vendors in an apparent single transaction, with payment resolved among all participating vendors.

16 Claims, 3 Drawing Sheets

SECURE, ANONYMOUS AUTHENTICATION FOR ELECTRONIC PURCHASING WITH DYNAMIC DETERMINATION OF PAYMENT PRICING AND TERMS AND CROSS VENDOR TRANSACTION RESOLUTION

TECHNICAL FIELD OF THE INVENTION

The present invention is directed, in general, to electronic sales transactions and, more specifically, to supporting anonymity, security, ease of use, and profitability at small amounts for electronic sales transactions.

BACKGROUND OF THE INVENTION

"Micro" payments, in the context of electronic funds transfers and/or Internet sales transactions, refers to payments of less than about $10.00, particularly those less than about $2.00. At such levels, the transaction costs significantly undercut even the nominal profitability for the transaction. This limitation constrains the nature of goods and services offered for sale electronically, as compared to physical sales where cash allows the transaction to be profitably conducted.

In addition, Internet purchases are generally encumbered by several other problems, including anonymity, security and ease of use. Online purchases and related fraud prevention measures normally require the buyer to provide personal information including name, mailing address, e-mail address, telephone number. The vendor may then sell this information, resulting in a barrage of electronic spam and traditional junk mail being sent to the seller and providing an avenue for identity theft. Anonymity of the type associated with cash transactions is not available in electronic transactions.

Credit or debit card information must also be disclosed in electronic transactions, creating security risks with each site at which a consumer makes purchases. Security and fraud prevention measures associated with most electronic transactions generally do not require independent verification of the purchaser's identity (apart from the personal information provided for billing), such that illicit purchases may be made using physically or electronically intercepted information. Finally, personal and credit or debit card information must be manually entered by the user at least for each site from which purchases are made, and in some cases for each individual transaction from a given site, which can become burdensome over time.

There is, therefore, a need in the art for a system supporting electronic transactions in a manner profitable at small dollar transaction values, as well as anonymous, secure, and easy to use.

SUMMARY OF THE INVENTION

To address the above-discussed deficiencies of the prior art, it is a primary object of the present invention to provide, for use in an electronic payment system, enablement of micropayments for electronic sales transactions in a secure and anonymous manner by a central payment agent maintaining declining balance accounts for users and separately authenticating and authorizing customer and vendor transaction requests and payment upon confirmation of delivery. No personal billing information for the customer need be provided to the vendor, maintaining anonymity of the customer. The vendor may electively set a pricing and terms policy allowing the price of the goods or services to dynamically vary across a series of transactions or transaction portions based on events such as quantity, bandwidth, or aggregate amount paid. A transaction may involve goods or services from multiple vendors in an apparent single transaction, with payment resolved among all participating vendors.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
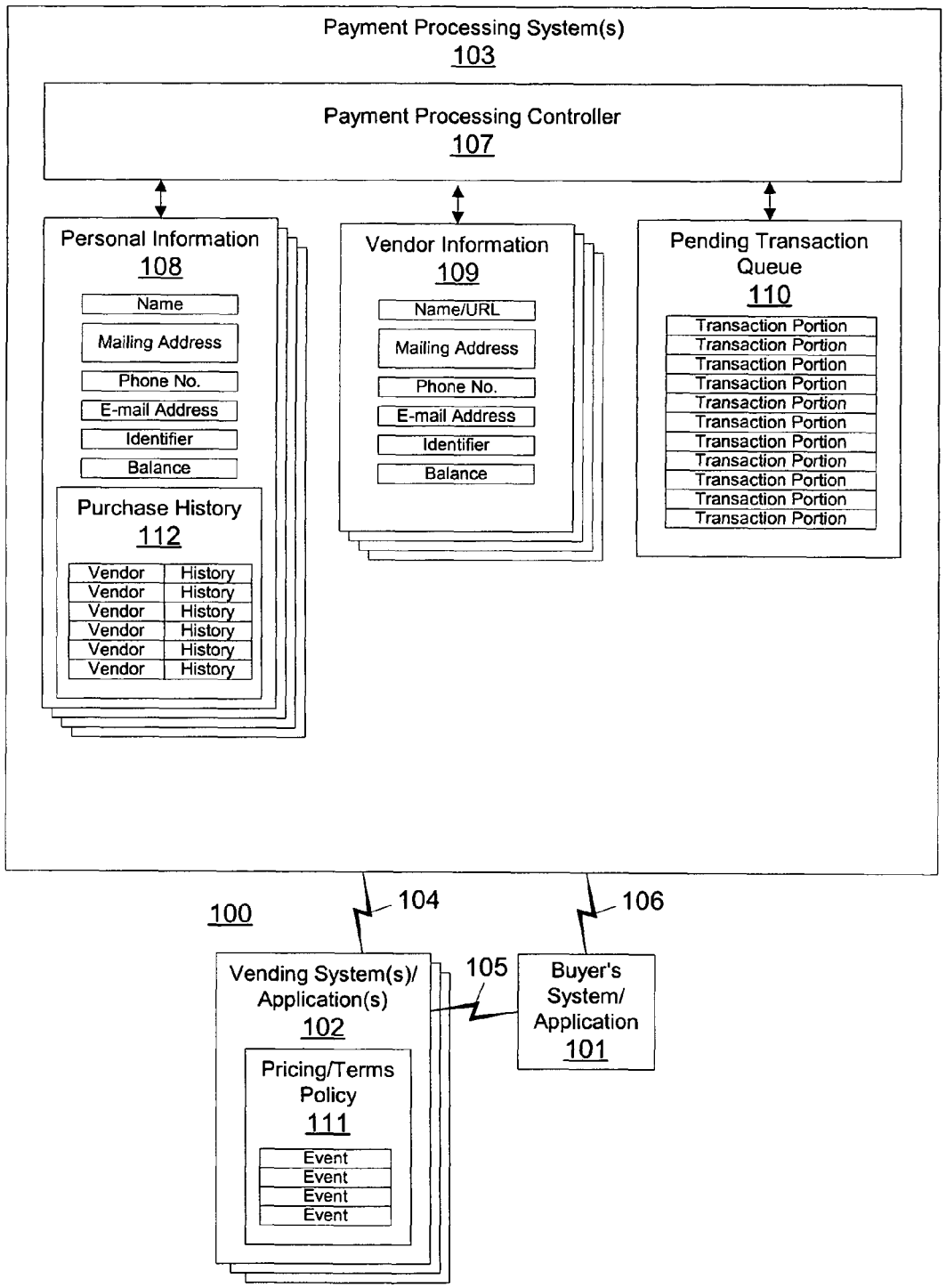
FIG. 1 depicts a network implementing an electronic sales transaction system according to one embodiment of the present invention.

FIG. 1 depicts a network implementing an electronic sales transaction system according to one embodiment of the present invention. Network 100 includes a buyer system 101, a vendor system 102, and a payment processor system 103. In the exemplary embodiment, systems 102-103 are data processing systems, while system 101 may be a data processing system or a mobile communication device such as, for example, a wireless telephone or personal digital assistant (PDA). Systems 101-103 are each communicably coupled to the other via communications links 104-106, which may be implemented simply by common connection to the Internet and/or may include various intermediate routers and/or voice communications system components. In accordance with the known art, systems 101-103 are capable of exchanging data, such as HyperText Markup Language (HTML) data or similar data, for conducting electronic sales transactions.

Those skilled in the art will recognize that the complete structure and operation of network 100 is not depicted or described. Instead, for simplicity and clarity, only so much of the network 100 and systems 101-103, and communication links 104-106 as is unique to the present invention or necessary for an understanding of the present invention is depicted and described.

In addition, numerous configurations of network 100 are possible. For instance, vendor system 102 for one enterprise may simply be implemented by an application executed on an Internet server together with a number of other applications for other enterprises. While depicted as separate, some elements of network 100 may be co-located, as in the example of a sales kiosk or vending machine located in a public area. Payment processing 103 may be implemented by multiple load distributed servers. The full range of possible variations is too extensive for individual enumeration herein, although most will be apparent to those of ordinary skill in the art.

In conducting electronic sales transactions, the customer identifies the item(s) to be purchased using standard selection methods appropriate to conducting transactions by an electronic medium. Similarly, the vendor optionally requests verification of the purchase requests using standard methods appropriate to the transaction medium. When the user initiates or confirms the purchase, two packets of information are sent by buyer system 101: one to vendor system 102 triggering or confirming the purchase and including a unique transaction identifier, and the other, a (partial) transaction request, to the payment processor system 103. The partial transaction request sent to the payment processor 103 by the buyer system 101 contains the unique transaction identifier, an identifier or other feature indicating that the transaction request originates with a buyer (e.g., a customer number or an amount formatted for debiting from an account), a goods or services identifier (from the vendor system 102), a transaction amount, and a buyer account identifier, as well as optionally an authentication object (password, personal identification number or PIN, or other unique value).

Upon receipt of the purchase order or confirmation, vendor system 102 transmits another (partial) transaction request to the payment processor 103. The partial transaction request sent to the payment processor 103 by the vendor system 102 similarly contains the unique transaction identifier, an identifier indicating that the transaction request originates from a vendor (e.g., a vendor number or an amount formatted for crediting to an account), a goods or services identifier, a transaction amount, and a vendor account identifier, as well as optionally an authentication object.

Payment processor 103 matches portions of various electronic sales transactions and, when all portions for a given electronic sales transaction have been received, the portions are combined to form a complete transaction request, which is then processed. Certain content from both transaction request portions must match, including the transaction amount and the goods or services identifier. In addition, other criteria such as valid buyer and vendor account identifiers and a transaction amount within an available balance or approved limit must also be found for the complete transaction request to be deemed valid by payment processor 103.

If the transaction request formulated from the combined portions is valid, the payment processor 103 initiates completion of the sales transaction. Otherwise, the payment processor 103 aborts the sales transaction and notifies the buyer system 101 and the vendor system 102 that the transaction has been terminated without completion.

If the transaction request is valid, the electronic payment processor or processing system 103 sends the vendor and optionally the customer a "transaction open" message. The vendor's server than initiates delivery of the requested goods or services being sold.

For completely electronic sales transactions (e.g., the goods or services sold are electronic content or access), payment processor 103 may respond to a valid transaction request by sending a "transaction open" message to the vendor system 102, and optionally also to the buyer system 101. The vendor system 102 then transmits the purchased goods or services (i.e., the content or an access code or the like) to the buyer system 101, which, upon receipt of the purchased goods or services, sends a "transaction complete" message to the payment processor 103. The vendor system 102 may optionally also send a "transaction complete" message to the payment processor 103 upon delivery of the purchased goods or services.

For electronic sales transactions that include some non-electronic aspect, such as physical delivery of an object (e.g., dispensing an item from a vending machine), the system may be readily modified to allow the user to transmit the "transaction complete" upon delivery of the item. In addition, a "transaction complete" message may be delivered by the vendor system 102.

Once the goods or services have been delivered, the customer or user system and optionally also the vendor system transmits a delivery complete message to the payment processing server 103. In response, the electronic payment processor 103 closes the transaction and settles the accounts for the parties involved.

The payment processor 103 includes a controller 107 which authenticates and approves (or authorizes) received customer or vendor transaction requests using corresponding customer and vendor information 108-109. Approved transaction requests are buffered or queued within a transaction queue 110 during authentication, and/or until matched or completed.

Figure 2:
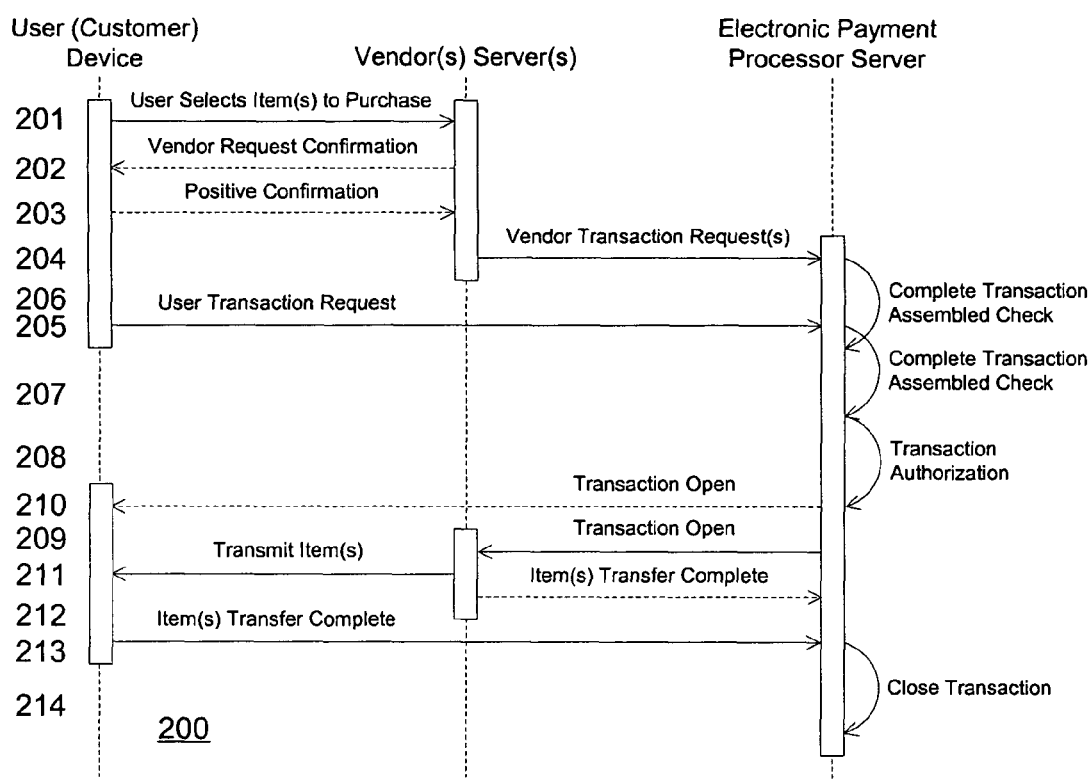
FIG. 2 is a message flow diagram for an electronic sales transaction according to one embodiment of the present invention.

FIG. 2 is a message flow diagram for an electronic sales transaction according to one embodiment of the present invention. The diagram does not conform to Unified Modeling Language (UML) standards, but is instead a high level overview of one possible valid sequence of messages passed among various systems involved. Additional proxy servers and/or translators may be located between any of the three systems shown for reasons of performance, scalability, and application to additional media device such as web-enable cell phones.

In the exemplary message flow 200, a message 201 is transmitted from the user or customer device to the vendor(s)

server(s), within which the user selects the item(s) to be purchased. Optionally, a message 202 requesting confirmation of the purchase request is sent from the vendor(s) server(s) to the user device and a positive confirmation message 203 is returned. A vendor transaction request message 204 is then sent from the vendor(s) server(s) to the electronic payment processing system, and a customer transaction request 205 from the user device to the electronic payment processing server. It should be noted that the order of the vendor and customer transaction requests is not critical, and that the request may arrive in any order.

In response to each received transaction request (whether a vendor transaction request or a customer transaction request), the electronic payment processing server initiates a check 206, 207 to determine if all transaction request portions have been received, such that a complete transaction request may be or has been formed. Upon detecting a complete transaction request, the electronic payment processing system conducts an internal payment authorization process 208.

If the payment is approved, the electronic payment processing system transmits a "transaction open" message 209 to the vendor(s) server(s), and optionally transmits a similar message 210 to the user device. It should be noted that the order of transmission of such messages 209, 210 to the vendor(s) server(s) and user device is not critical.

Upon receipt of the "transaction open" message 209, vendor(s) server(s) transmit the purchased item 211 (e.g., content or access code) to the user device, then optionally transmits a "transaction complete" or "item(s) transfer complete" message 212 to the electronic payment processing system. Upon receipt of the purchased item(s), the user device transmits a "transaction complete" or "item(s) transfer complete" message 213 to the electronic payment processing system. Preferably the electronic payment processing system does not close the transaction 214 unless and until a "item(s) transfer complete" message 213 is received from the user device. In some situations, however, receipt of an "item(s) transfer complete" message 212 from the vendor(s) server(s) may be sufficient to prompt closure of the transaction. When the transaction is closed 214, the vendor(s) and customer accounts are appropriately credited and debited as part of settling the transaction. Disbursements to the vendor and replenishments of a customer's declining balance account may be periodically conducted.

In addition (or in lieu of) the transaction request matching process described above, the electronic payment processing server may periodically check each pending transaction request, looking for matches and/or complete transaction request. Transaction requests received from various sources and relating to different transactions are accumulated within the electronic payment processing system, within one or more queues (e.g., a single queue for all transaction requests or one for vendor transaction requests and one for customer transaction requests). A timeout mechanism may be provided for deleting pending transaction requests (customer or vendor) that have not been matched or completed within a predefined time interval.

In the present invention, the transaction request to the electronic payment processing system is split or bifurcated between the customer and the vendor to prevent compromise of the anonymity of the customer while assuring payment of the vendor. Conventional electronic funds transfer or electronic payment systems require the vendor to collect and submit personal billing information for the customer, including the customer's credit/debit card number and expiration date, the name on card, billing address for account, and optionally the card verification code (CVC). The vendor then submits such personal billing information as part of billing and fraud prevention efforts.

Personal information required from the customer to verify the payment information entered often includes an electronic mail address for delivery of the purchase content or an access code or other secondary authorization, with vendors often sharing such addresses (but, for legitimate vendors, not payment information) with third parties, producing significant amounts of unwanted electronic and physical mail to the customer. The transmission of personal information by the customer also provides a foundation for identity theft and other fraudulent activity, since the information input by the customer to the vendor is all handled in one place where a single "sniffer" may watch packets sent from the customer to the vendor, from which all data necessary for an illegal purchase may be assembled (with decryption "cracks" as necessary).

In the present invention, however, payment authorization is secured without disclosure of such personal billing information by the customer to the vendor(s), preserving the anonymity of the customer and the security of the personal billing information. Authentication of the vendor and the customer are both handled electronically, but the authentication of the customer does NOT go through the vendor as in conventional systems. Instead, the user is authenticated directly with the electronic payment processing system. For this reason, and due to the accumulation of charges for a customer against a declining balance account, micro-payments may be successfully transacted electronically without disproportionate risk of fraud or unacceptably inflating the transaction amounts to support the transaction costs.

In addition, current electronic funds transfer or electronic payment systems control authentication completely on the vendor's side of the transaction, with no verification of delivery of the purchased content or services. While substantial attention is paid to fraudulent means used by customers to purchase online goods and services, little attention is being paid to web sites that pose as vendors and receive payment with delivering promised goods or services. Such sites often also take the user's private payment information and use it to generate fraudulent purchases, which cannot be avoided under current methods.

The present invention improves on existing electronic payment methods by bifurcating both authentication of the vendor and customer and authorization of the transaction by the vendor and customer, combining messages for such processes at the payment processing server. "Sniffing" payment related data from intercepted packets thus becomes more difficult, since the data originates from multiple origins. While some redundant information is included in all packets, information unique to all packets is necessary to complete and effect a verified transaction. Since no personal information is exchanged between the vendor and the user, no chance exists for the information to be used for spam, making illegal purchases, or charging a customer's account illegally.

Rather than simple bifurcation, the present invention may be viewed as "n-furcating" the transaction request among n portions (where n is any positive integer greater than 1), allowing multiple vendors to participate in a given transaction with resolution as described in further detail below. Vendor transaction requests may originate from separate servers and be sent via separate paths to the electronic payment processing system, or may be collected and relayed by a single "agent" vendor server and/or contained within a single message identifying all vendor(s). The transactions requests (vendor and customer) should include an indicator of the number of vendors or transaction requests that will form a complete transaction request.

Figure 3:
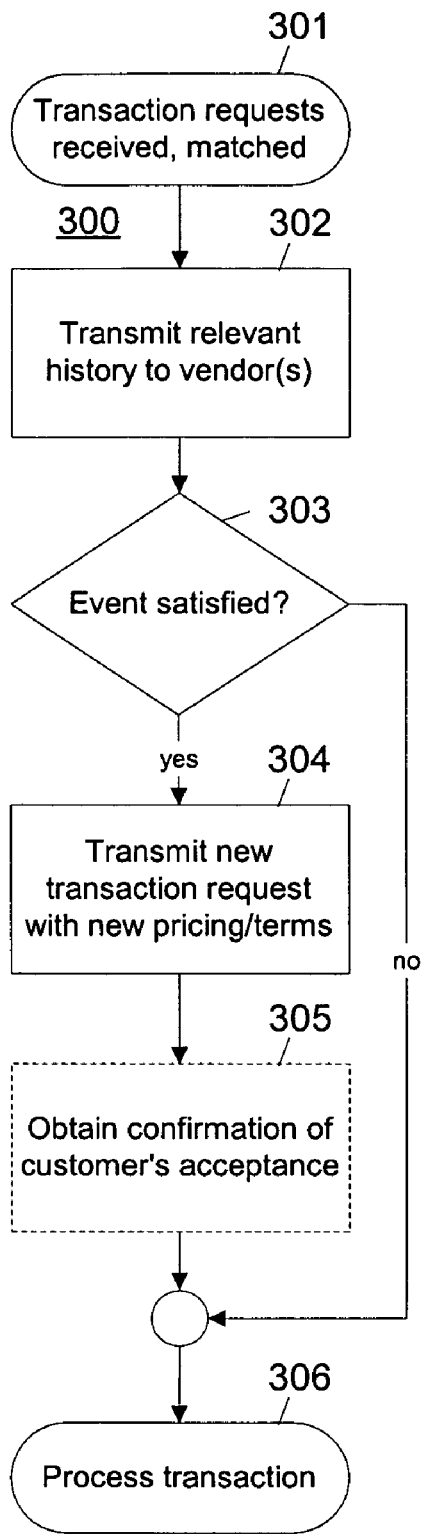
FIG. 3 is a high level flowchart for a process of dynamic determination of electronic payment pricing and terms according to one embodiment of the present invention.

FIG. 3 is a high level flowchart for a process of dynamic determination of electronic payment pricing and terms according to one embodiment of the present invention. Current methods for electronic purchases require that the entire goods or services be purchased with a single autonomous transaction that, once complete, precludes purchase of additional goods or services without an additional transaction or agreement (e.g., purchasing or downloading a single copy of a magazine, analogous to making a single purchase from a news stand), or purchasing a subscription to the goods or services, similar to purchasing a subscription to a physical newspaper or magazine, where the customer can download the latest issue every day or month.

Such sales methods have been necessary due to the transaction cost associated with electronic funds transfers or electronic payments. With the ability to profitable receive micropayments electronically using the system described above, however, a need arises to provide vendors (and customers) with a higher level of control over purchasing options, as well as greater flexibility over terms and pricing.

The present invention allows prices and terms to fluctuate dynamically for the vendor's goods or service. The vendor places the goods for sale electronically, defining a policy for the purchase terms through a number of events such as, but not limited to, cost, quantity, time, bandwidth (amount or rate), and usage. When a specified event is triggered, the next set of pricing and terms become active, and subsequent events may modify pricing and terms yet again.

For electronic sales transactions, the pricing and terms policy might be implemented, for example, to allow a customer to purchase single articles from issues of an electronic magazine until the customer's payments aggregate to the annual subscription price, at which time no further charge is made for accesses during the remainder of a subscription period starting with the first purchase (a "pay cap"). Instead, a vendor might discount content purchased by a given customer after a certain quantity has been purchased (for "off-the-rack" sales). Alternatively, a site might stream media to a customer at a cost of $1 for the first minute and $0.10 for any additional minute(s), or the first minute free for promotional purposes and $0.50 for each additional minute. The event triggering a change in price or terms may be as flexible as the vendor desires, allowing more compelling offers for goods or services. In addition, the price or term variations may apply to a series of transactions or portions of a single transaction.

Referring back to FIG. 1, the vendor system(s) 102 define the pricing and terms policy 111 based on events and corresponding pricing or terms (or changes). The payment processor 103 maintains, within the personal information 108 for a given customer, a purchase history 112 for associated vendors, which is used to modify payment terms within a requested transaction. An important feature is that the vendor holds no information (except possibly a caching server proxy) regarding the customer's purchases, preserving the customer's anonymity.

The exemplary process 300 depicted in FIG. 3 begins with transaction requests from a customer and at least one vendor being received and matched at the electronic payment processor (step 301). The customer's relevant purchase history from that vendor is then transmitted from the electronic payment processor to the vendor (step 302), and the vendor determines whether an event in the pricing and terms policy is satisfied by that history (step 303).

If so, a new transaction request is transmitted by the vendor to the payment processor (step 304). Optionally, acceptance of the new pricing or terms by the customer may be requested by the payment processor (step 305). Alternatively, a lower payment amount than that specified within the transaction request from the customer may be assumed to be acceptable to the customer. The transaction is then processed (step 306). If no event in the customer's relevant purchase history satisfies an event specified within the pricing and terms policy is satisfied by that history (step 303), the transaction is simply processed with the payment terms specified in the transaction requests (step 306).

Rather than transmitting the customer's relevant purchase history 112 to the vendor, the vendor's pricing and terms policy 111 may be transmitted to the payment processor 103 for determination of whether the customer's relevant purchase history 112 satisfies any event specified in the policy 111. If so, the payment terms are modified according to the policy 111 and the customer and vendor may be notified within the "transaction open" message.

The dynamic determination of pricing and terms as described above may be employed with either micro-payments or for all pricing strategies (e.g., conventional payment methods).

Figure 4:
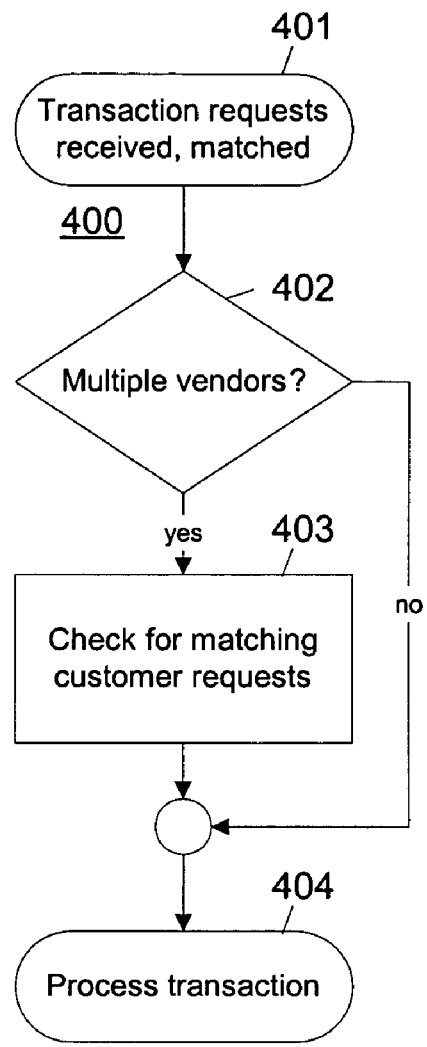
FIG. 4 is a high level flowchart for a process of cross vendor transaction payment resolution according to one embodiment of the present invention.

FIG. 4 is a high level flowchart for a process of cross vendor transaction payment resolution according to one embodiment of the present invention. Traditional payment processing does not support cross-vendor payment resolution. Currently vendors provide content and services directly or through formal contracts with other vendors, with the content and services sold to consumers through single purchases or subscriptions. For a vendor to continue creating compelling offerings, the vendor must continue both to create content and to negotiate additional contracts with other vendors. With the current size and continued growth of the Internet, however, contacting the number of vendors necessary and negotiating the requisite contracts is both time consuming and expensive.

In addition, consumers are placed in the onerous position of purchasing content and services separately from the numerous vendors, increasing inconvenience and potential security breaches. With the present invention, vendors are enabled to sell their content for the price and terms that they define, and any vendor may then create offerings utilizing any other vendor's published content and services. The vendor may, for example, create an accumulation of content for a user based on a profile for the user. The consumer purchases from a single vendor and the transaction is resolved, with the payment split at the transaction point according to the payment and terms specified directly by the various vendors involved.

The process 400 depicted in FIG. 4 begins with transaction requests being received and matched by the electronic payment processing system. A check is first made to determine if multiple vendors are involved (step 402). If so, a search is conducted for matching customer requests (step 403). In the present invention, transaction requests for, for instance, content accumulated from multiple vendors should contain an identification of each content item, the corresponding vendor (from which the vendor accounts may be identified) and the price. The vendor and customer transaction requests should match in these respects.

The multiple vendors and corresponding content items may be identified within a single pair of vendor and customer requests. Alternatively, the customer system may formulate a single transaction request identifying the multiple vendors and items based on information obtains from the selling or "contact" vendor. Each vendor then submits a separate transaction request, triggered by messages from the contact vendor. The payment processor accumulates and matches the vendor transaction request with the single customer transaction request, processing the transaction to the extent that matching between the customer and vendor transaction requests match and ignoring portions of the transaction specified in the customer transaction request for which no matching vendor transaction request is received.

In yet another alternative, separate pairs of customer and vendor transaction request for each vendor involved. The "contact" vendor supplies the required information to both the customer and the remaining vendors, which generate transaction requests accordingly. The transaction request pairs are either sequentially or batch processed when received by the payment processor. The multiple customer transaction requests may be generated transparently to the customer, maintaining the appearance of the "contact" vendor as the source for the content purchased while protecting the remaining vendors in collecting payment for their content.

In each of the alternatives discussed above, the payment is split at the point of transaction completion among the vendors contributing goods or services to the package purchased by the customer. The transaction is thus processed to completion (step 404) in this manner.

The present invention allows a consumer to purchase content or services from one or more vendors transparently, appearing as a single transaction for the consumer while appropriately dispersing the payment across the vendors. The customer's purchasing experience is that of purchasing the content or service from a single vendor, who accumulates requested content or services from n–1 other vendors along with their pricing and terms. After the content and/or services are delivered, each participating vendor is paid according to their pricing and terms. An incentive is thus created for vendors to discover the content and services, along with corresponding pricing and terms, for other vendors. Either micropayment or conventional payment systems may be employed for such transactions.

Cross vendor payment resolution according to the present invention allows vendors to create compelling offerings of content and services by combining content and services from other vendors into a single offering, with payment resolution to each vendor participating in the offering. An easy and flexible system is thus created for vendors to provide web services as an aggregated single purchase for a consumer with each vendor providing part of the solution being paid for their specific contribution. Since many vendors have not resolved how to charge for their web service offerings, this solution allows those vendors to price web services in a straightforward manner bypassing the need for each vendor to negotiate individual agreements with every other vendor.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. An electronic payment processing system comprising:
a payment processor having at least one network connection and receiving, for a plurality of electronic sales transactions involving a customer and each of a plurality of vendors, each electronic sales transaction representing a purchase by the customer from a different one of the plurality of vendors involving a charge to the customer and a payment to the respective vendor,
a customer transaction request for the plurality of electronic sales transactions, received by the payment processor, via the network connection from a customer system corresponding to the customer, the customer transaction request including a single unique transaction identifier, and
a plurality of vendor transaction requests, separate from the customer transaction request, for the plurality of electronic sales transactions, received by the payment processor, via the network connection from one or more vendor systems corresponding to the plurality of vendors, each of the vendor transaction requests containing the single, unique transaction identifier, wherein the customer transaction request and the vendor transaction requests each include an identification of a number of customer and vendor transaction requests forming a complete set of transaction requests corresponding to the single unique transaction identifier,
wherein the vendor systems do not receive personal information for the customer for transaction verification, and
wherein the payment processor processes the plurality of electronic sales transactions based on the single unique transaction identifier and resolves the plurality of electronic sales transactions as a single transaction by the customer in charges to an account of the customer and as a plurality of transactions by each of the plurality of vendors in payments to the vendors.

2. The electronic payment processing system according to claim 1, wherein personal billing information for the customer is contained within the customer transaction request from the customer.

3. The electronic payment processing system according to claim 1, wherein personal billing information for the customer is contained within the electronic payment processing system and accessed based upon an identifier within the customer transaction request from the customer.

4. The electronic payment processing system according to claim 1, wherein the payment processor separately authenticates the customer transaction request from the customer system and the vendor transaction requests from the vendor systems.

5. The electronic payment processing system according to claim 1, wherein the payment processor authorizes the electronic sales transactions based on correspondence between the transaction identifier, transaction amounts and goods or services identifiers from the customer transaction request and the transaction identifier, transaction amounts and goods or services identifiers from the vendor transaction requests.

6. The electronic payment processing system according to claim 1, wherein the electronic payment processing system processes micro-payments.

7. The electronic payment processing system according to claim 1, wherein the electronic payment processing system employs a declining balance account for the customer.

8. The electronic payment processing system according to claim 1, further comprising:
the customer system communicably coupled to the payment processor;
the vendor system communicably coupled to the payment processor;
at least one record relating to the customer;
at least one record relating to each of the vendors; and
one or more queues containing pending transaction requests, wherein the payment processor at least one of matches transaction requests upon receipt with transaction requests within the one or more queues and periodically searches for counterpart transaction requests within the one or more queues.

9. The electronic payment processing system according to claim 1, wherein the payment processor dynamically determines a payment amount for the electronic sales transactions from a pricing and terms policy defined by each of the one or more vendors.

10. The electronic payment processing system according to claim 1, wherein the payment processor resolves payment for the electronic sales transactions across each of the vendors transparently to the customer.

11. A method of processing electronic payments comprising:
- at a payment processor having at least one network connection, receiving, for a plurality of electronic sales transactions involving a customer and each of a plurality of vendors, each electronic sales transaction involving a purchase by the customer from a different one of the plurality of vendors involving a charge to the customer and a payment to the respective vendor,
- receiving, at the payment processor, a single customer transaction request for the plurality of electronic sales transactions, via the network connection from a customer system corresponding to the customer, the customer transaction request including a single unique transaction identifier, and
- receiving, at the payment processor, a plurality of vendor transaction requests, separate from the customer transaction request, for the plurality of electronic sales transactions, via the network connection from one or more vendor systems corresponding to the plurality of vendors, each of the vendor transaction requests containing the single, unique transaction identifier,
- wherein the customer transaction request and the vendor transaction requests each include an identification of a number of customer and vendor transaction requests forming a complete set of transaction requests corresponding to the single unique transaction identifier,
- wherein the vendor systems do not receive personal information for the customer for transaction verification; and
- within the payment processor, processing the plurality of electronic sales transactions based on the single unique transaction identifier and resolving the plurality of electronic sales transactions as a single transaction by the customer in charges to an account of the customer and as a plurality of transactions by each of the plurality of vendors in payments to the vendors.

12. The method according to claim 11, further comprising:
processing the electronic sales transactions using personal billing information for the customer contained within the customer transaction request from the customer.

13. The method according to claim 11, further comprising:
processing the electronic sales transactions using personal billing information for the customer contained within an electronic payment processing system and accessed based upon an identifier within the customer transaction request from the customer.

14. The method according to claim 11, further comprising:
separately authenticating the customer transaction request from the customer system and the vendor transaction requests from the one or more vendor systems.

15. The method according to claim 11, further comprising:
authorizing the electronic sales transactions based on correspondence between the transaction identifier, transaction amounts and goods or services identifiers from the customer transaction request and the transaction identifier, transaction amounts and goods or services identifiers from the vendor transaction requests.

16. The method according to claim 11, further comprising:
processing a micro-payment for at least one of the electronic sales transactions.

* * * * *